US012567123B2

(12) United States Patent
Chou et al.

(10) Patent No.: US 12,567,123 B2
(45) Date of Patent: Mar. 3, 2026

(54) METHOD FOR CONFIGURING BUFFER AND IMAGE SYNTHESIS APPARATUS

(71) Applicant: REALTEK SEMICONDUCTOR CORP., Hsinchu (TW)

(72) Inventors: Kai-Hsiang Chou, Hsinchu (TW); Chen-Wei Yu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 125 days.

(21) Appl. No.: 18/735,391

(22) Filed: Jun. 6, 2024

(65) Prior Publication Data

US 2025/0182236 A1     Jun. 5, 2025

(30) Foreign Application Priority Data

Dec. 4, 2023    (TW) .................................. 112146963

(51) Int. Cl.
*G06T 1/60* (2006.01)

(52) U.S. Cl.
CPC ............ *G06T 1/60* (2013.01); *G06T 2200/28* (2013.01)

(58) Field of Classification Search
CPC ............................... G06T 1/60; G06T 2200/28
See application file for complete search history.

(56) References Cited

U.S. PATENT DOCUMENTS

| | | | | |
|---|---|---|---|---|
| 7,170,522 | B2 * | 1/2007 | Yamaura ................... | G06T 1/20 |
| | | | | 345/506 |
| 8,462,377 | B2 * | 6/2013 | Ovsiannikov ............. | G06T 1/20 |
| | | | | 348/222.1 |
| 9,386,234 | B2 * | 7/2016 | Mills ....................... | G09G 5/026 |
| 9,438,911 | B2 * | 9/2016 | Lin ......................... | H04N 19/80 |
| 2008/0049037 | A1 * | 2/2008 | Kurupati ................... | G06T 1/60 |
| | | | | 345/560 |
| 2008/0111823 | A1 * | 5/2008 | Fan ........................ | G06T 3/4092 |
| | | | | 345/531 |
| 2009/0316799 | A1 * | 12/2009 | Chen ..................... | H04N 19/436 |
| | | | | 375/240.27 |
| 2010/0201825 | A1 * | 8/2010 | Huang ................. | H04N 7/0122 |
| | | | | 348/E5.022 |
| 2012/0081578 | A1 * | 4/2012 | Cote ..................... | H04N 25/134 |
| | | | | 348/E5.024 |
| 2025/0182236 | A1 * | 6/2025 | Chou ........................ | G06T 1/60 |

FOREIGN PATENT DOCUMENTS

CN          114168524 A      3/2022

* cited by examiner

*Primary Examiner* — Motilewa Good-Johnson
(74) *Attorney, Agent, or Firm* — Li & Cai Intellectual Property (USA) Office

(57)            ABSTRACT
A method for configuring a buffer and an image synthesis apparatus are provided. The image synthesis apparatus includes a memory, and the memory includes a plurality of line buffers. The method includes the following step: dividing, according to a plurality of depths of a plurality of target planes, each of a plurality of target line buffers into a plurality of sections for respectively storing row pixel data of the target planes. The sections correspond to the depths of the target planes, respectively.

12 Claims, 6 Drawing Sheets

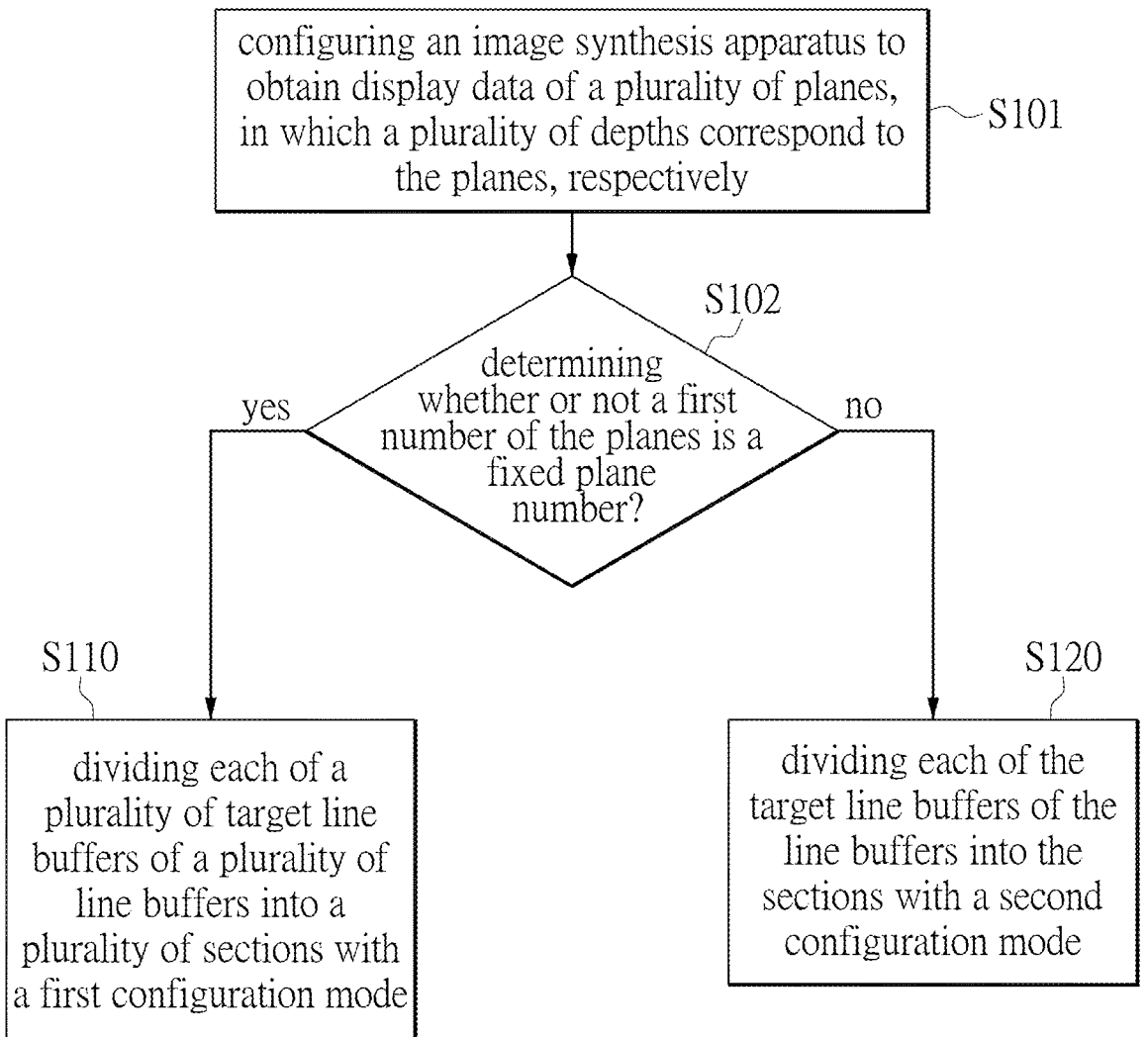

configuring an image synthesis apparatus to obtain display data of a plurality of planes, in which a plurality of depths correspond to the planes, respectively ~S101

S102 determining whether or not a first number of the planes is a fixed plane number?

yes          no

S110 dividing each of a plurality of target line buffers of a plurality of line buffers into a plurality of sections with a first configuration mode

S120 dividing each of the target line buffers of the line buffers into the sections with a second configuration mode

FIG. 2

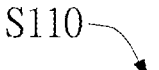

S110

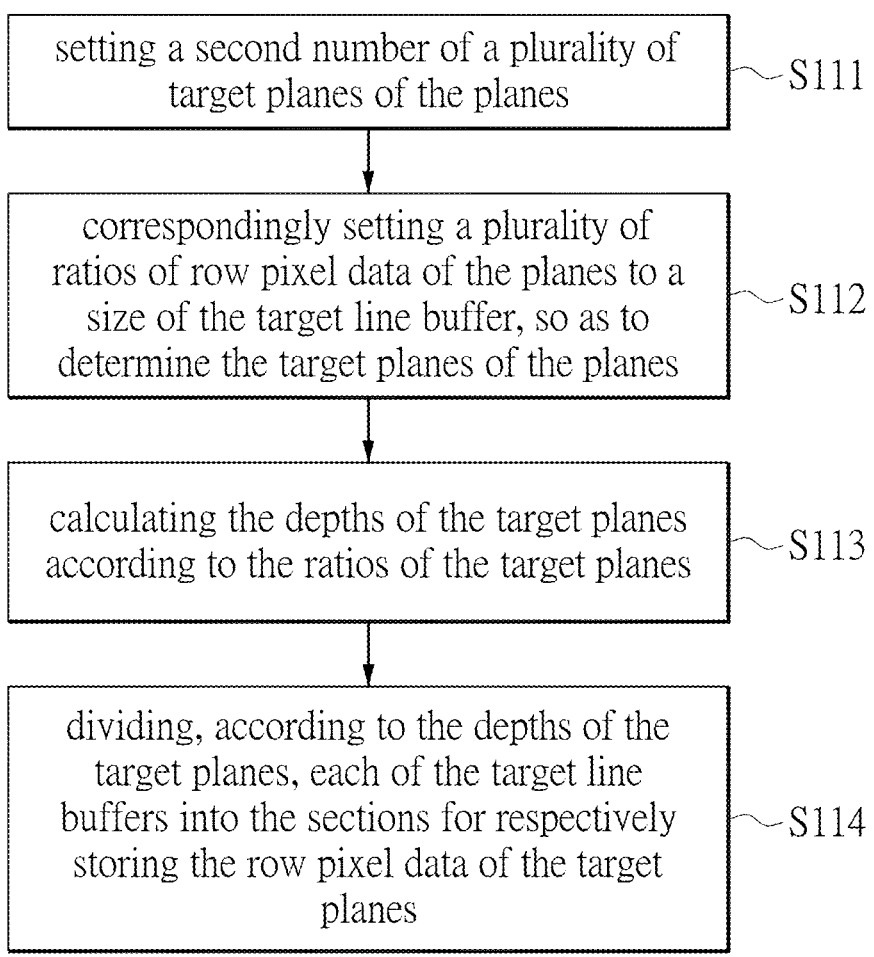

setting a second number of a plurality of target planes of the planes ~S111 correspondingly setting a plurality of ratios of row pixel data of the planes to a size of the target line buffer, so as to determine the target planes of the planes ~S112 calculating the depths of the target planes according to the ratios of the target planes ~S113 dividing, according to the depths of the target planes, each of the target line buffers into the sections for respectively storing the row pixel data of the target planes ~S114

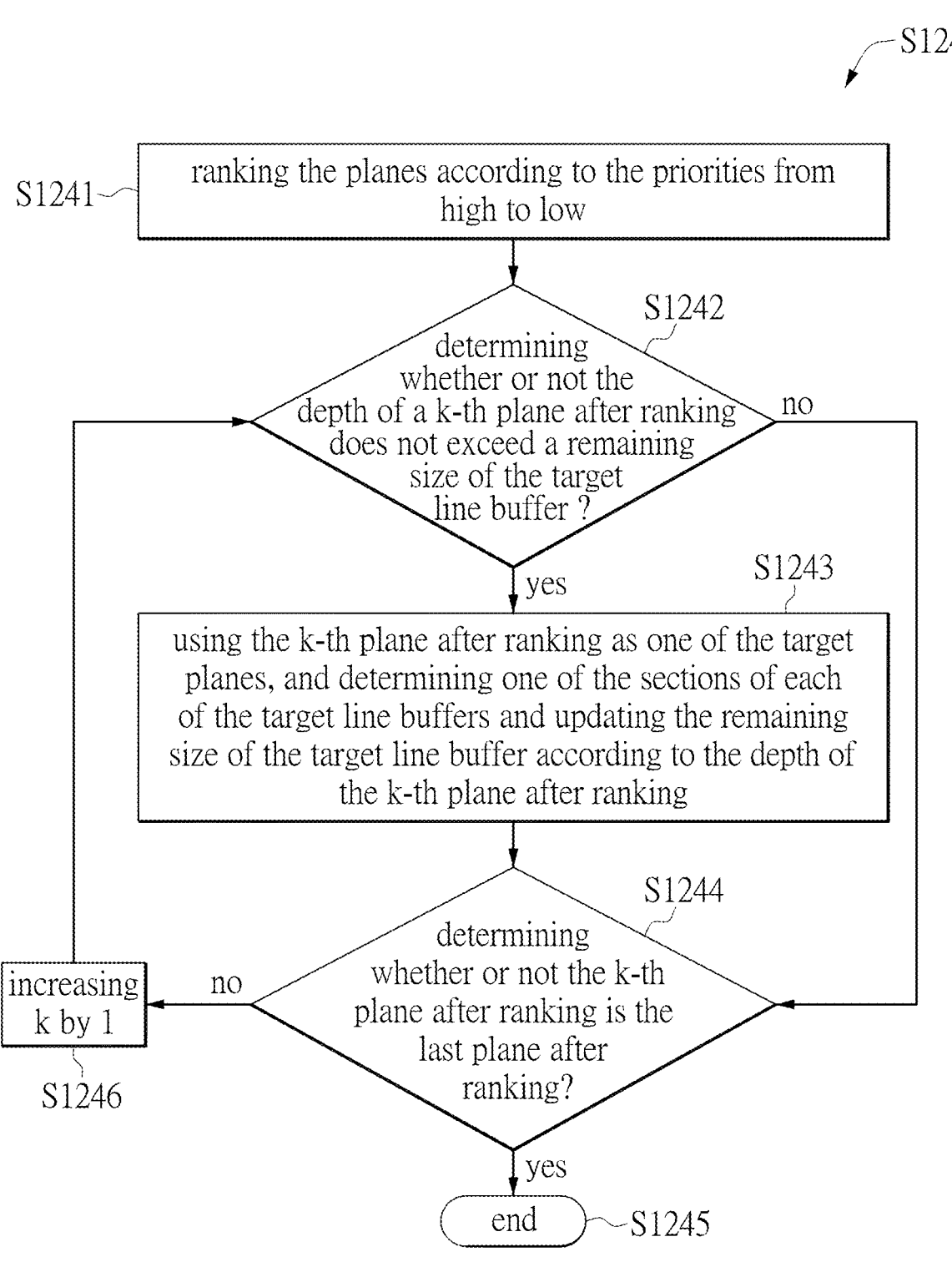

S1241 — ranking the planes according to the priorities from high to low

S1242 determining whether or not the depth of a k-th plane after ranking does not exceed a remaining size of the target line buffer ?          no yes          S1243 using the k-th plane after ranking as one of the target planes, and determining one of the sections of each of the target line buffers and updating the remaining size of the target line buffer according to the depth of the k-th plane after ranking

S1244 determining whether or not the k-th plane after ranking is the last plane after ranking?

increasing k by 1          no

S1246 yes end          S1245

FIG. 4B

METHOD FOR CONFIGURING BUFFER AND IMAGE SYNTHESIS APPARATUS

CROSS-REFERENCE TO RELATED PATENT APPLICATION

This application claims the benefit of priority to Taiwan Patent Application No. 112146963, filed on Dec. 4, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to sharing a line buffer, and more particularly to a method for configuring a buffer and an image synthesis apparatus in which each target line buffer of a memory is configured to be divided into a plurality of sections for respectively storing row pixel data of a plurality of target planes.

BACKGROUND OF THE DISCLOSURE

A set-top box usually has an image synthesis apparatus that can be used to process a plurality of videos and a plurality of graphics, and each of the videos or each of the graphics can be used as a plane. In addition, the image synthesis apparatus includes a memory, and the memory includes a plurality of line buffers for storing display data of a plurality of planes.

However, the size of each of the line buffers is fixed, and each of the line buffers is usually used to store row pixel data of one single plane. Therefore, if the plurality of planes need to be simultaneously displayed through the image synthesis apparatus, more line buffers will be required, thereby causing a significant increase in the cost of the memory.

SUMMARY OF THE DISCLOSURE

In response to the above-referenced technical inadequacies, the present disclosure provides a method for configuring a buffer and an image synthesis apparatus in which each target line buffer of a memory is configured to be divided into a plurality of sections for respectively storing row pixel data of a plurality of target planes.

In order to solve the above-mentioned problems, one of the technical aspects adopted by the present disclosure is to provide a method for configuring buffer. The method is applied to an image synthesis apparatus, the image synthesis apparatus includes a memory, and the memory includes a plurality of line buffers. The method includes: configuring the image synthesis apparatus to obtain display data of a plurality of planes, in which a plurality of depths correspond to the planes, respectively; determining whether or not a first number of the planes is a fixed plane number; and dividing, in response to determining that the first number of the planes is the fixed plane number, each of a plurality of target line buffers of the line buffers into a plurality of sections with a first configuration mode. The process of dividing each of the target line buffers into the sections with the first configuration mode includes: setting a second number of a plurality of target planes of the planes; correspondingly setting a plurality of ratios of row pixel data of the planes to a size of the target line buffer, so as to determine the target planes of the planes; calculating the depths of the target planes according to the ratios of the target planes; and dividing, according to the depths of the target planes, each of the target line buffers into the sections for respectively storing the row pixel data of the target planes. The sections correspond to the depths of the target planes, respectively.

In order to solve the above-mentioned problems, another one of the technical aspects adopted by the present disclosure is to provide an image synthesis apparatus. The image synthesis apparatus includes a memory and a processing circuit. The memory includes a plurality of line buffers. The processing circuit is coupled to the memory and configured to execute processes of: configuring the image synthesis apparatus to obtain display data of a plurality of planes, in which a plurality of depths correspond to the planes, respectively; determining whether or not a first number of the planes is a fixed plane number; and dividing, in response to determining that the first number of the planes is the fixed plane number, each of a plurality of target line buffers of the line buffers into a plurality of sections with a first configuration mode. The process of dividing each of the target line buffers into the sections with the first configuration mode includes: setting a second number of a plurality of target planes of the planes; correspondingly setting a plurality of ratios of row pixel data of the planes to a size of the target line buffer, so as to determine the target planes of the planes; calculating the depths of the target planes according to the ratios of the target planes; and dividing, according to the depths of the target planes, each of the target line buffers into the sections for respectively storing the row pixel data of the target planes. The sections correspond to the depths of the target planes, respectively.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 2 is a flowchart of a method for configuring a buffer according to one embodiment of the present disclosure;

FIG. 3 is a flowchart for dividing each of a plurality of target line buffers into a plurality of sections with a first configuration mode according to one embodiment of the present disclosure;

FIGS. 4A and 4B are flowcharts for dividing each of the target line buffers into a plurality of sections with a second configuration mode according to one embodiment of the present disclosure;

DETAILED DESCRIPTION OF THE EXEMPLARY EMBODIMENTS

Figure 1:
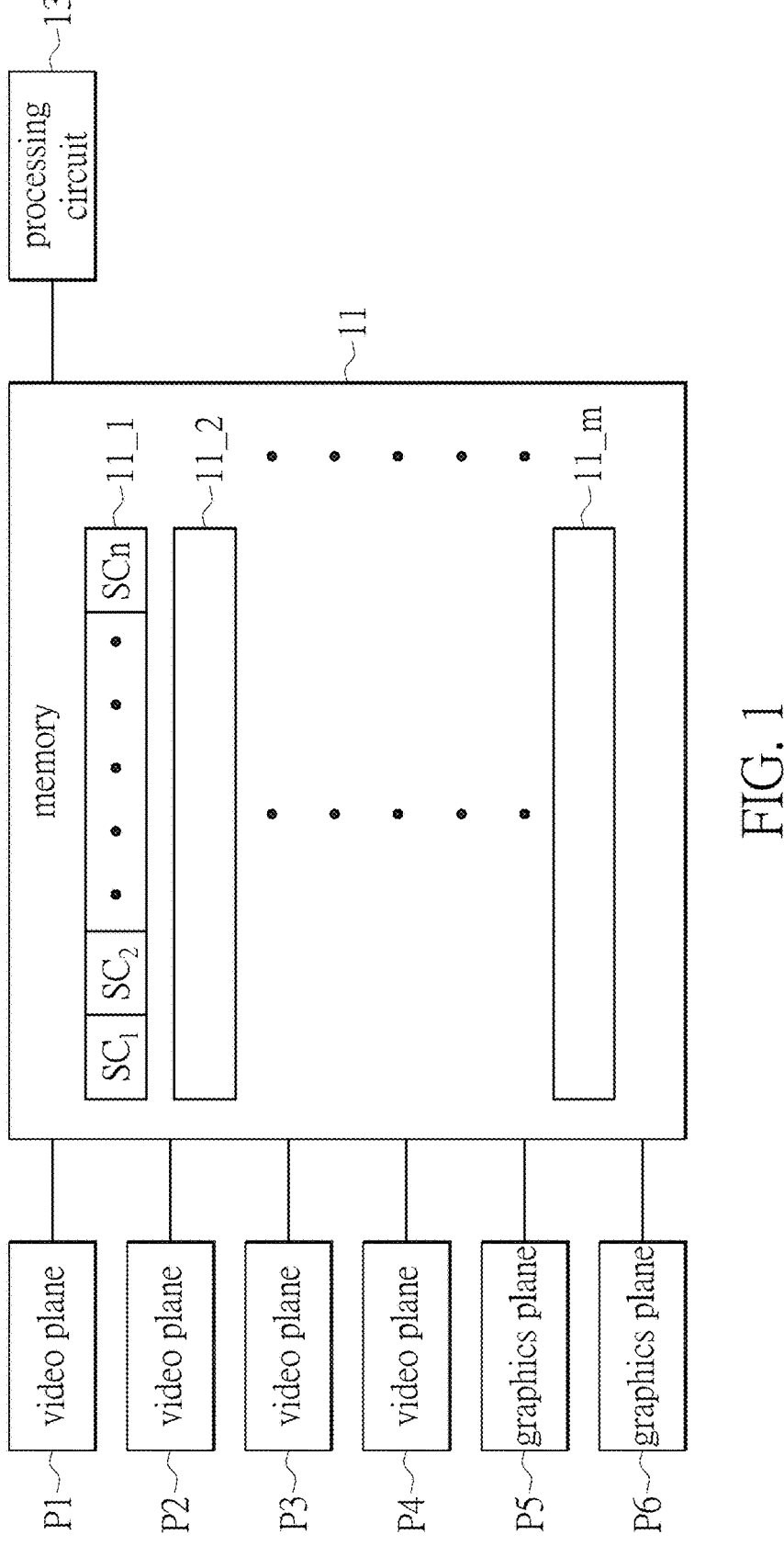
FIG. 1 is a functional block diagram of an image synthesis apparatus according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1 and FIG. 2, in which FIG. 1 is a functional block diagram of an image synthesis apparatus according to one embodiment of the present disclosure, and FIG. 2 is a flowchart of a method for configuring a buffer according to one embodiment of the present disclosure. As shown in FIG. 1, an image synthesis apparatus 1 of the present disclosure includes a memory 11 and a processing circuit 13. The memory 11 may be a static random-access memory (SRAM), and the memory 11 includes a plurality of line buffers 11_1 to 11_$m$(i.e., m is an integer greater than 1).

The processing circuit 13 is coupled to the memory 11. The processing circuit 13 can be implemented by hardware (e.g., a central processing unit and a computer memory) in cooperation with software and/or firmware. However, specific implementations of the processing circuit 13 are not limited in the present disclosure. In addition, the processing circuit 13 is configured to perform a method for configuring a buffer of the present disclosure. As shown in FIG. 2, the method of the present disclosure includes the following steps.

Step S101: configuring an image synthesis apparatus to obtain display data of a plurality of planes, in which a plurality of depths correspond to the planes, respectively.

Specifically, the image synthesis apparatus 1 can be, for example, disposed in a display. A screen of the display can be divided into a plurality of areas, and each of the areas can display a video or a graphic, so that each of the videos or each of the graphics can correspond to a displayed area and act as a plane. Therefore, when it is necessary to simultaneously display multiple ones of the plane through the image synthesis apparatus 1, these planes may include a plurality of video planes and a plurality of graphics planes. For ease of illustration, the image synthesis apparatus 1 of this embodiment is exemplified to obtain the display data of six planes, and the six planes include four video planes P1 to P4 and two graphics planes P5 to P6, but the present disclosure is not limited thereto.

Step S102: determining whether or not a first number of the planes is a fixed plane number. If yes, the method proceeds to step S110. If not, the method proceeds to step S120.

Step S110: dividing each of a plurality of target line buffers of a plurality of line buffers into a plurality of sections with a first configuration mode.

Step S120: dividing each of the target line buffers of the line buffers into the sections with a second configuration mode.

Reference is also made to FIG. 3, which is a flowchart for dividing each of a plurality of target line buffers into a plurality of sections with a first configuration mode according to one embodiment of the present disclosure. As shown in FIG. 3, step S110 includes the following steps.

Step S111: setting a second number of a plurality of target planes of the planes.

Step S112: correspondingly setting a plurality of ratios of row pixel data of the planes to a size of the target line buffer, so as to determine the target planes of the planes.

Specifically, the processing circuit 13 can set the image synthesis apparatus 1 to simultaneously display some or all of the planes, and each of the planes simultaneously displayed by the image synthesis apparatus 1 can be referred to as the target plane. Therefore, the second number of the target planes is less than or equal to the first number of the planes.

Figure 5A:
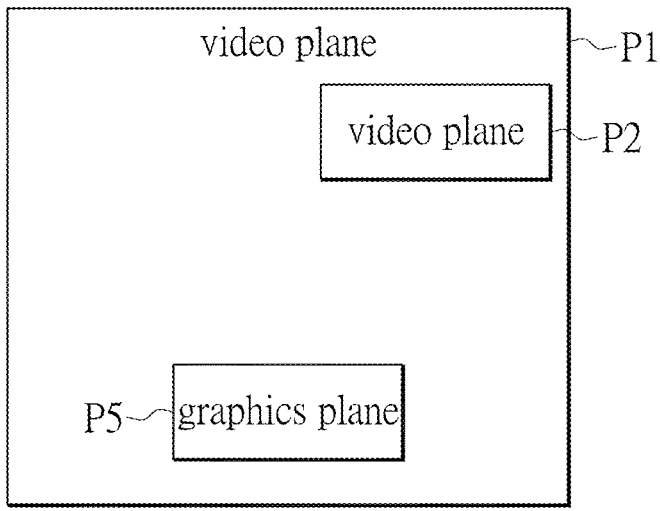
FIG. 5A is a schematic view showing a plurality of planes being simultaneously displayed through the image synthesis apparatus according to a first embodiment of the present disclosure.
Figure 5B:
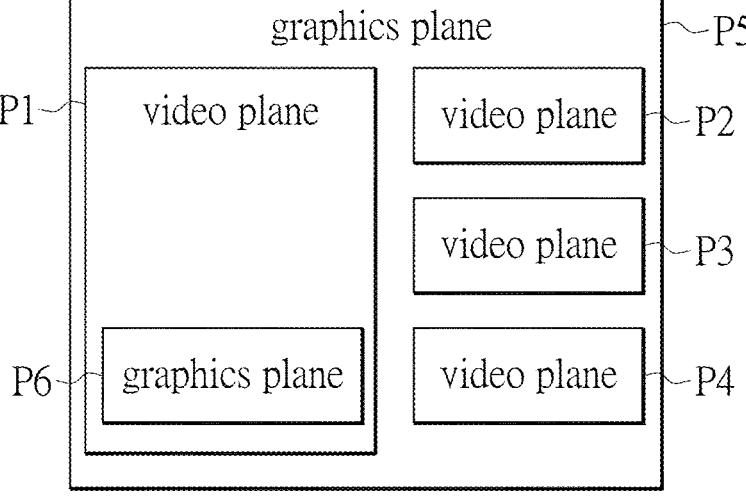
FIG. 5B is a schematic view showing the planes being simultaneously displayed through the image synthesis apparatus according to a second embodiment of the present disclosure.

Reference is made to FIGS. 5A and 5B. Taking the above content as an example, the image synthesis apparatus 1 obtains the display data of the six planes P1 to P6. However, in the embodiment of FIG. 5A, if it is only necessary to simultaneously display the video plane P1, the video plane P2, and the graphics plane P5 through the image synthesis apparatus 1 (i.e., only some of the six planes P1 to P6 need to be displayed at the same time), the processing circuit 13 can set the second number of the target planes as 3. In addition, according to the actual image quality and requirements of the video plane P1, the video plane P2, and the graphics plane P5, the processing circuit 13 can correspondingly set a plurality of ratios of row pixel data of the six planes P1 to P6 to the size of the target line buffer as ½, ¼, 0, 0, ¼, and 0.

In other words, when the ratio of the row pixel data of a certain plane to the size of the target line buffer is set as 0, it indicates that said plane temporarily does not need to be displayed. Therefore, allocation or reservation of storage space in the target line buffer for the row pixel data of said plane is unnecessary. However, the present disclosure is not limited to the above example.

On the other hand, in the embodiment of FIG. 5B, if it is necessary to simultaneously display all of the six planes P1 to P6 through the image synthesis apparatus 1, the processing circuit 13 can set the second number of the target planes as 6. In addition, according to the actual image quality and requirements of the planes P1 to P6, the processing circuit 13 can correspondingly set the ratios of the row pixel data of the planes P1 to P6 to the size of the target line buffer. The relevant details are the same as those mentioned above, and will not be repeated herein.

Step S113: calculating the depths of the target planes according to the ratios of the target planes.

Step S114: dividing, according to the depths of the target planes, each of the target line buffers into the sections for respectively storing the row pixel data of the target planes.

Specifically, the depth of each of the target planes is calculated by a formula of:

$$D_p = TD \times \left( \frac{R_p}{\sum_{k=1}^{n} R_k} \right).$$

Here, $D_p$ is the depth of a p-th target plane, TD is the size of the target line buffer, $R_p$ is the ratio of the p-th target plane, $R_k$ is the ratio of a k-th target plane, and n is the second number of the target planes. For ease of illustration, the line buffer 11_1 is exemplified as being one of the target line buffers in this embodiment, and the target planes are represented by $TP_1$ to $TP_n$.

As such, in step S113, the processing circuit 13 can calculate depths $D_1$ to $D_n$ of the target planes $TP_1$ to $TP_n$ according to ratios $R_1$ to $R_n$ of the target planes $TP_1$ to $TP_n$. However, the target planes $TP_1$ to $TP_n$, the ratios $R_1$ to $R_n$ and the depths $D_1$ to $D_n$ are not shown in FIG. 1.

Furthermore, according to the depths $D_1$ to $D_n$ of the target planes $TP_1$ to $TP_n$, the processing circuit 13 can divide each of the target line buffers into sections $SC_1$ to $SC_n$ for storing the row pixel data of the target planes $TP_1$ to $TP_n$, respectively. In this embodiment, the sections $SC_1$ to $SC_n$ of each of the target line buffers can correspond to the depths $D_1$ to $D_n$ of the target planes $TP_1$ to $TP_n$, respectively.

Taking the embodiment of FIG. 5A as an example, the video plane P1, the video plane P2, and the graphics plane P5 will be the 1-th target plane $TP_1$, the 2-th target plane $TP_2$, and the 3-rd target plane $TP_3$, respectively. Hence, in the situation where the size of the target line buffer is 3,840 pixels, the depth $D_1$ of the 1-th target plane $TP_1$ (i.e., the video plane P1) can be calculated by the above formula as 1,920 pixels.

In addition, the depths $D_2$ and $D_3$ of the 2-th target plane $TP_2$ and the 3-th target plane $TP_3$ (i.e., the video plane P2 and the graphics plane P5) are respectively calculated by the above formula as 960 pixels and 960 pixels. Accordingly, the processing circuit 13 can divide each of the target line buffers into the three sections $SC_1$ to $SC_3$ of 1,920 pixels, 960 pixels, and 960 pixels for respectively storing the row pixel data of the target planes $TP_1$ to $TP_3$. However, the present disclosure is not limited to the above example.

It should be noted that, when each of the target line buffers is divided into the sections $SC_1$ to $SC_n$ with the first configuration mode, the processing circuit 13 can set the second number and the ratios $R_1$ to $R_n$ of the target planes $TP_1$ to $TP_n$ through a graphical user interface (GUI), but the present disclosure is not limited thereto. That is to say, in the first configuration mode, the processing circuit 13 can dynamically set the depths $D_1$ to $D_n$ of the target planes $TP_1$ to $TP_n$. However, the depths $D_1$ to $D_n$ of the target planes $TP_1$ to $TP_n$ may also be fixed.

Figure 4A:
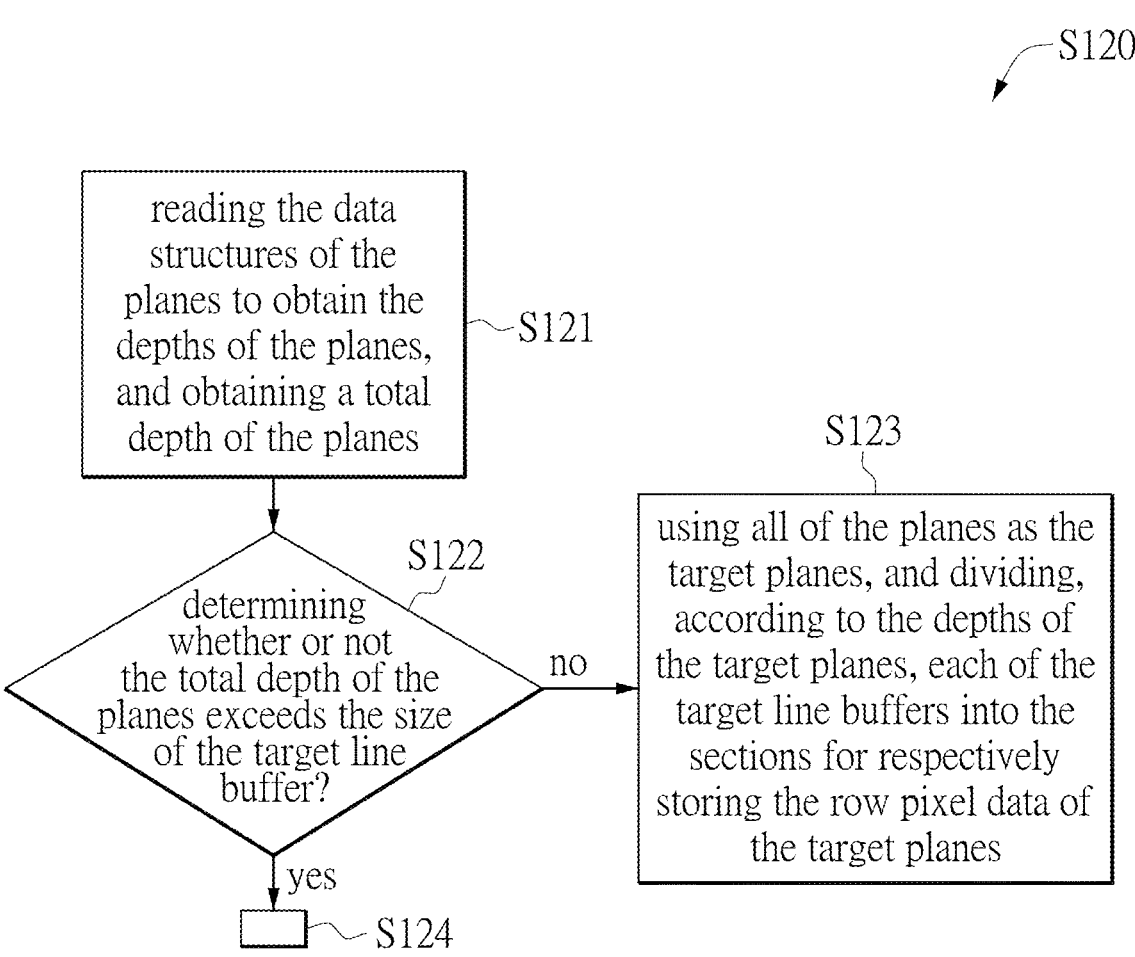

Therefore, in this embodiment, a plurality of data structures further correspond to the planes, respectively. In addition, the data structure of each of the planes records the depth of the plane. Referring to FIGS. 4A and 4B, FIGS. 4A and 4B are flowcharts for dividing each of the target line buffers into a plurality of sections with a second configuration mode according to one embodiment of the present disclosure. As shown in FIG. 4A, step S120 includes the following steps.

Step S121: reading the data structures of the planes to obtain the depths of the planes, and obtaining a total depth of the planes.

Taking the embodiment of FIG. 1 as an example, six data structures Str1 to Str6 can correspond to the planes P1 to P6, respectively. In step S121, the processing circuit 13 can read the data structures Str1 to Str6 to obtain the depths of the planes P1 to P6, and obtain the total depth of the planes P1 to P6. However, the data structures Str1 to Str6 are also not shown in FIG. 1.

Step S122: determining whether or not the total depth of the planes exceeds the size of the target line buffer. If not, the method proceeds to step S123. If yes, the method proceeds to step S124.

Step S123: using all of the planes as the target planes, and dividing, according to the depths of the target planes, each of the target line buffers into the sections for respectively storing the row pixel data of the target planes.

Taking the embodiment of FIG. 1 as an example, if the total depth of the planes P1 to P6 does not exceed the size of the target line buffer, the processing circuit 13 can use all of the planes P1 to P6 as the target planes $TP_1$ to $TP_6$. In addition, according to the depths $D_1$ to $D_6$ of the target planes $TP_1$ to $TP_6$ (i.e., the depths of the planes P1 to P6 obtained by reading the data structures Str1 to Str6), the processing circuit 13 can divide each of the target line buffers into the sections $SC_1$ to $SC_6$ for respectively storing the row pixel data of the target planes $TP_1$ to $TP_6$.

On the other hand, if the total depth of the planes P1 to P6 exceeds the size of the target line buffer, the processing circuit 13 can only use some of the planes P1 to P6 as the target planes $TP_1$ to $TP_n$. In order to achieve the above purpose, the data structures Str1 to Str6 further record a plurality of priorities of the planes P1 to P6, respectively. In addition, as shown in FIG. 4B, step S124 includes the following steps.

Step S1241: ranking the planes according to the priorities from high to low.

Step S1242: determining whether or not the depth of a k-th plane after ranking does not exceed a remaining size of the target line buffer. If yes, the method sequentially proceeds to steps S1243 and S1244. If not, the method directly proceeds to step S1244.

Specifically, k is a variable starting from 1. When the method proceeds to step S1242 for the first time, the remaining size of the target line buffer is the original size of the target line buffer. Taking the above content as an example, when the method proceeds to step S1242 for the first time, the remaining size of the target line buffer is 3,840 pixels.

Step S1243: using the k-th plane after ranking as one of the target planes, and determining one of the sections of each of the target line buffers and updating the remaining size of the target line buffer according to the depth of the k-th plane after ranking.

Step S1244: determining whether or not the k-th plane after ranking is the last plane after ranking. If yes, the method proceeds to step S1245, which ends the method. If not, the method proceeds to step S1246, so as to update the value of k (i.e., increasing k by 1). After step S1246, the method returns to step S1242.

Taking the above content as an example, if the video plane P1 is the 1-th plane after ranking, and the depth of the video plane P1 is 1,920 pixels and does not exceed the current remaining size (i.e., 3,840 pixels) of the target line buffer, the processing circuit 13 can use the video plane P1 as the 1-th target plane $TP_1$. According to the depth of the video plane P1, the processing circuit 13 can determine that the section $SC_1$ of each of the target line buffers is 1,920 pixels, and update the remaining size of the target line buffer to be the result of 3,840 pixels minus 1,920 pixels (i.e., 1,920 pixels).

As mentioned above, the section $SC_1$ can be used to store the row pixel data of the video plane P1. Then, if the video plane P3 is the 2-th plane after ranking, but the depth of the video plane P3 exceeds the current remaining size (i.e., 1,920 pixels) of the target line buffer, the processing circuit 13 will not use the video plane P3 as one of the target planes. The processing circuit 13 will determine whether or not the depth of the 3-th plane after ranking does not exceed the current remaining size of the target line buffer.

Similarly, if the video plane P2 is the 3-th plane after ranking, and the depth of the video plane P2 is 960 pixels and does not exceed the current remaining size (i.e., 1,920 pixels) of the target line buffer, the processing circuit 13 can use the video plane P2 as the 2-th target plane $TP_2$. According to the depth of the video plane P2, the processing circuit 13 can determine that the section $SC_2$ of each of the target line buffers is 960 pixels, and update the remaining size of the target line buffer to be the result of 1,920 pixels minus 960 pixels (i.e., 960 pixels). The relevant details are the same as those mentioned above, and will not be repeated herein.

In other words, for each of the planes after ranking, the processing circuit 13 can determine whether or not the depth of the current plane does not exceed the remaining size of the target line buffer. In addition, in response to determining that the depth of the current plane does not exceed the remaining size of the target line buffer, the processing circuit 13 can use the current plane as one of the target planes, and can determine, according to the depth of the current plane, one of the sections of each of the target line buffers. Therefore, in the situation where the first number of the planes is not the fixed plane number (i.e., new planes can be added), the processing circuit 13 can optimize space utilization of the target line buffer in the second configuration mode.

On the other hand, the image synthesis apparatus 1 can further include a decompression circuit and a scaling circuit (not shown in FIG. 1) for processing the videos and the graphics, so as to update the display data of the planes. Hence, the sections of each of the target line buffers can also be temporarily used to store the row pixel data of the planes processed by the decompression circuit or the scaling circuit.

Beneficial Effects of the Embodiments

In conclusion, in the method for configuring the buffer and the image synthesis apparatus provided by the present disclosure, by virtue of "dividing, according to the depths of the target planes, each of the target line buffers into the sections for respectively storing the row pixel data of the target planes," a technical effect of sharing the line buffer can be achieved, and an increase in the cost of the memory can thus be avoided.

Specifically, in the method for configuring the buffer and the image synthesis apparatus provided by the present disclosure, each of the target line buffers can be divided into the sections with the first configuration mode or the second configuration mode. In the first configuration mode, by virtue of "correspondingly setting a plurality of ratios of row pixel data of the planes to a size of the target line buffer," the method for configuring the buffer and the image synthesis apparatus provided by the present disclosure can dynamically set the depths of the target planes. Furthermore, in the second configuration mode, by virtue of "reading the data structures of the planes to obtain the depths of the planes," "ranking, in response to determining that the total depth of the planes exceeds the size of the target line buffer, the planes according to the priorities from high to low," "determining, for each of the planes after ranking, whether or not the depth of the plane does not exceed a remaining size of the target line buffer," and "using, in response to determining that the depth of the plane does not exceed the remaining size of the target line buffer, the plane as one of the target planes, and determining, according to the depth of the plane, one of the sections of each of the target line buffers," the method for configuring the buffer and the image synthesis apparatus provided by the present disclosure can optimize the space utilization of the target line buffer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for configuring a buffer, wherein the method is applied to an image synthesis apparatus, the image synthesis apparatus includes a memory, and the memory includes a plurality of line buffers, the method comprising:
    configuring the image synthesis apparatus to obtain display data of a plurality of planes, wherein a plurality of depths correspond to the planes, respectively;
    determining whether or not a first number of the planes is a fixed plane number; and
    dividing, in response to determining that the first number of the planes is the fixed plane number, each of a plurality of target line buffers of the line buffers into a plurality of sections with a first configuration mode;
    wherein the process of dividing each of the target line buffers into the sections with the first configuration mode includes:
    setting a second number of a plurality of target planes of the planes;
    correspondingly setting a plurality of ratios of row pixel data of the planes to a size of the target line buffer, so as to determine the target planes of the planes;
    calculating the depths of the target planes according to the ratios of the target planes; and
    dividing, according to the depths of the target planes, each of the target line buffers into the sections for respectively storing the row pixel data of the target planes;
    wherein the sections correspond to the depths of the target planes, respectively.

2. The method according to claim 1, wherein the depth of each of the target planes is calculated by a formula of:

$$D_p = TD \times \left( \frac{R_p}{\sum_{k=1}^{n} R_k} \right);$$

wherein $D_p$ is the depth of a p-th target plane, TD is the size of the target line buffer, $R_p$ is the ratio of the p-th target plane, Rx is the ratio of a k-th target plane, and n is the second number of the target planes.

3. The method according to claim 1, further comprising:

dividing, in response to determining that the first number of the planes is not the fixed plane number, each of the target line buffers of the line buffers into the sections with a second configuration mode.

4. The method according to claim 3, wherein a plurality of data structures further correspond to the planes, respectively, and the data structure of each of the planes records the depth of the plane.

5. The method according to claim 4, wherein the process of dividing each of the target line buffers into the sections with the second configuration mode includes:

reading the data structures of the planes to obtain the depths of the planes, and obtaining a total depth of the planes;

determining whether or not the total depth of the planes exceeds the size of the target line buffer; and using, in response to determining that the total depth of the planes does not exceed the size of the target line buffer, all of the planes as the target planes, and dividing, according to the depths of the target planes, each of the target line buffers into the sections for respectively storing the row pixel data of the target planes.

6. The method according to claim 5, wherein the data structures further record a plurality of priorities of the planes, respectively, and the process of dividing each of the target line buffers into the sections with the second configuration mode further includes:

ranking, in response to determining that the total depth of the planes exceeds the size of the target line buffer, the planes according to the priorities from high to low;

determining, for each of the planes after ranking, whether or not the depth of the plane does not exceed a remaining size of the target line buffer; and using, in response to determining that the depth of the plane does not exceed the remaining size of the target line buffer, the plane as one of the target planes, and determining, according to the depth of the plane, one of the sections of each of the target line buffers; wherein the section is used to store the row pixel data of the plane.

7. An image synthesis apparatus, comprising:

a memory including a plurality of line buffers; and a processing circuit coupled to the memory and configured to execute processes of:

configuring the image synthesis apparatus to obtain display data of a plurality of planes, wherein a plurality of depths correspond to the planes, respectively;

determining whether or not a first number of the planes is a fixed plane number; and dividing, in response to determining that the first number of the planes is the fixed plane number, each of a plurality of target line buffers of the line buffers into a plurality of sections with a first configuration mode;

wherein the process of dividing each of the target line buffers into the sections with the first configuration mode includes:

setting a second number of a plurality of target planes of the planes;

correspondingly setting a plurality of ratios of row pixel data of the planes to a size of the target line buffer, so as to determine the target planes of the planes;

calculating the depths of the target planes according to the ratios of the target planes; and dividing, according to the depths of the target planes, each of the target line buffers into the sections for respectively storing the row pixel data of the target planes;

wherein the sections correspond to the depths of the target planes, respectively.

8. The image synthesis apparatus according to claim 7, wherein the depth of each of the target planes is calculated by a formula of:

$$D_p = TD \times \left( \frac{R_p}{\sum_{k=1}^{n} R_k} \right);$$

wherein $D_p$ is the depth of a p-th target plane, TD is the size of the target line buffer, $R_p$ is the ratio of the p-th target plane, $R_k$ is the ratio of a k-th target plane, and n is the second number of the target planes.

9. The image synthesis apparatus according to claim 7, wherein the processing circuit is further configured to execute processes of:

dividing, in response to determining that the first number of the planes is not the fixed plane number, each of the target line buffers of the line buffers into the sections with a second configuration mode.

10. The image synthesis apparatus according to claim 9, wherein a plurality of data structures further correspond to the planes, respectively, and the data structure of each of the planes records the depth of the plane.

11. The image synthesis apparatus according to claim 10, wherein the process of dividing each of the target line buffers into the sections with the second configuration mode includes:

reading the data structures of the planes to obtain the depths of the planes, and obtaining a total depth of the planes;

determining whether or not the total depth of the planes exceeds the size of the target line buffer; and using, in response to determining that the total depth of the planes does not exceed the size of the target line buffer, all of the planes as the target planes, and dividing, according to the depths of the target planes, each of the target line buffers into the sections for respectively storing the row pixel data of the target planes.

12. The image synthesis apparatus according to claim 11, wherein the data structures further record a plurality of priorities of the planes, respectively, and the process of dividing each of the target line buffers into the sections with the second configuration mode further includes:

ranking, in response to determining that the total depth of the planes exceeds the size of the target line buffer, the planes according to the priorities from high to low;

determining, for each of the planes after ranking, whether or not the depth of the plane does not exceed a remaining size of the target line buffer; and using, in response to determining that the depth of the plane does not exceed the remaining size of the target line buffer, the plane as one of the target planes, and determining, according to the depth of the plane, one of the sections of each of the target line buffers; wherein the section is used to store the row pixel data of the plane.

\* \* \* \* \*